Dec. 27, 1938.   C. DESOUTTER   2,141,971
PORTABLE ELECTRIC DRILL AND THE LIKE
Filed April 29, 1937    5 Sheets-Sheet 1
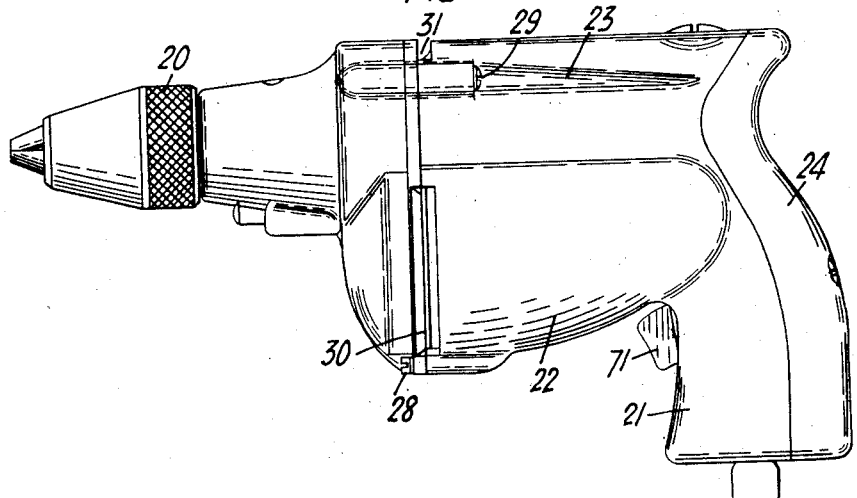
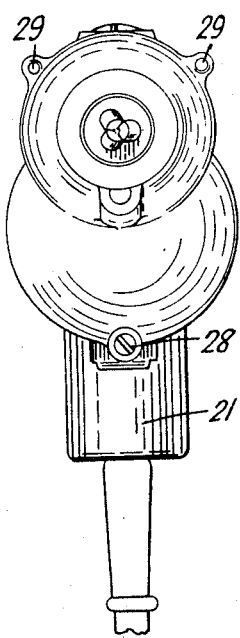 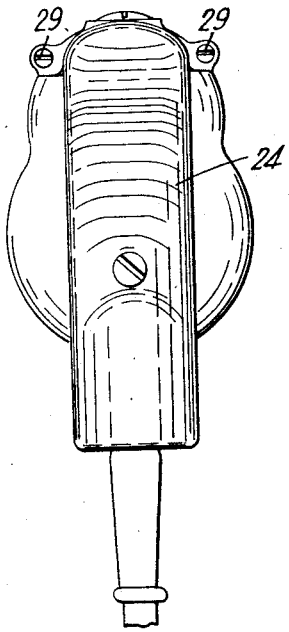

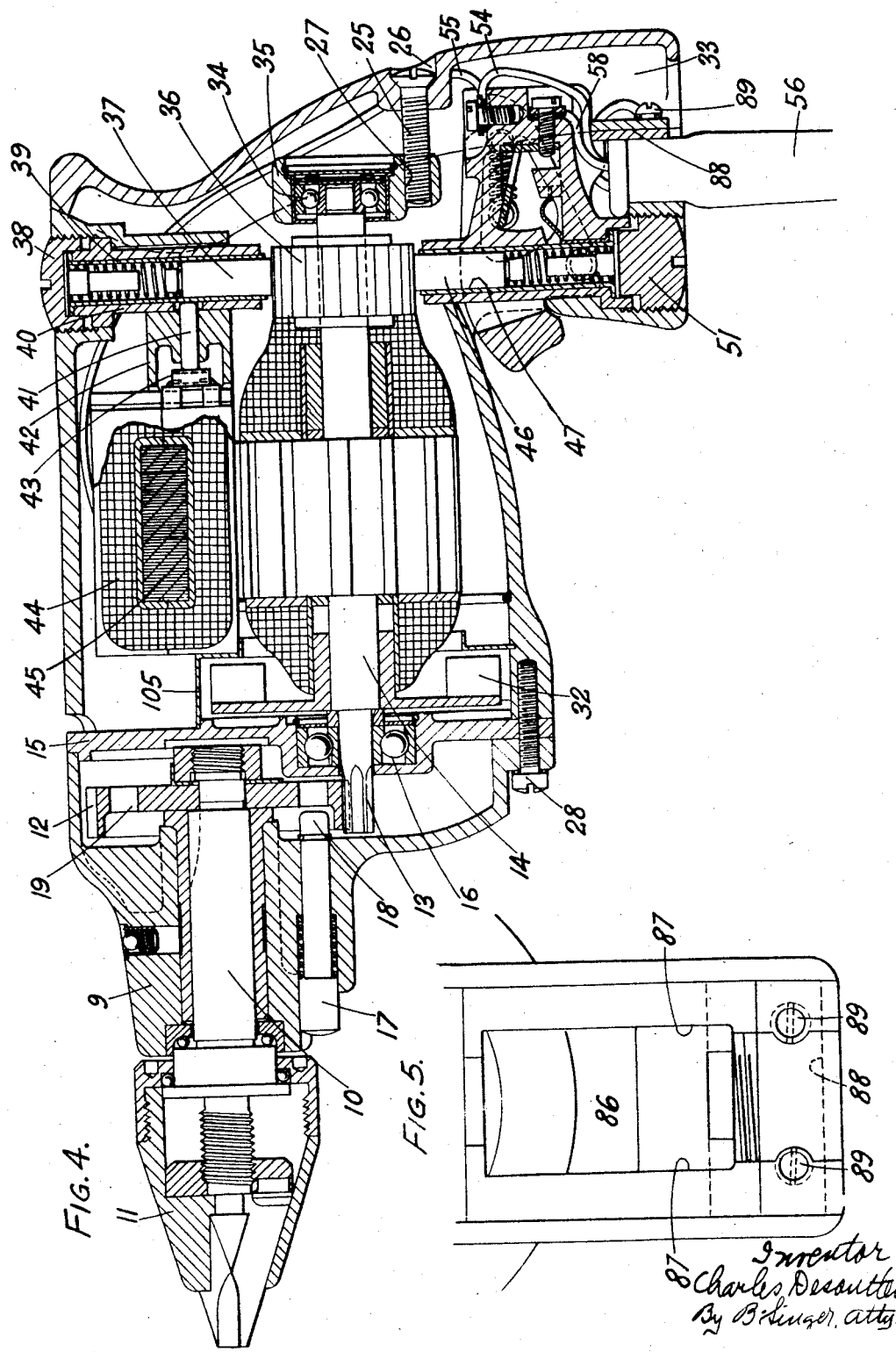

Dec. 27, 1938.   C. DESOUTTER   2,141,971
PORTABLE ELECTRIC DRILL AND THE LIKE
Filed April 29, 1937   5 Sheets-Sheet 3

INVENTOR
Charles Desoutter
BY B. Linger
ATTORNEY

Dec. 27, 1938.                C. DESOUTTER                 2,141,971
                    PORTABLE ELECTRIC DRILL AND THE LIKE
                    Filed April 29, 1937        5 Sheets-Sheet 5

Inventor
Charles Desoutter
By B. Luiger
Attorney

Patented Dec. 27, 1938

2,141,971

UNITED STATES PATENT OFFICE 2,141,971

PORTABLE ELECTRIC DRILL AND THE LIKE

Charles Desoutter, London, England

Application April 29, 1937, Serial No. 139,820

8 Claims. (Cl. 172—36)

This invention relates to rotary tool devices carried and applied by hand and particularly to portable electric drills and the like.

It has for its primary object to lessen the cost of production of such tools when utilizing horseshoe field magnets and giving the minimum bulk to the containing casing.

Another object is so to construct the casing and the horseshoe field magnet to be contained therein that the whole of the machining of the interior of the casing can take place around the axis of the armature shaft.

It has for a further object to provide a construction by means of which the horseshoe magnet can readily be mounted in the casing and dismounted therefrom.

A still further object is to give to the casing such a shape and form that it readily can be constructed with a gun or pistol grip with the operating mechanism or trigger in a position ready to a finger of the hand grasping the pistol grip.

The above and other objects will appear from the following detailed description given with reference to the accompanying drawings.

In order that the invention may be better understood, it will now be described with reference to the accompanying drawings, in which:—

Fig. 1 is a side elevation of the complete tool.

Fig. 2 is an end elevation of Fig. 1 taken from the chuck end.

Fig. 3 is an end elevation of Fig. 1 taken from the handle end.

Fig. 4 shows to a larger scale the complete tool in sectional elevation.

Fig. 5 is a fragmentary end elevation of a portion of the handle to a still larger scale.

Fig. 12 is a perspective view of the field magnet and its winding removed from the casing.

Figure 6:
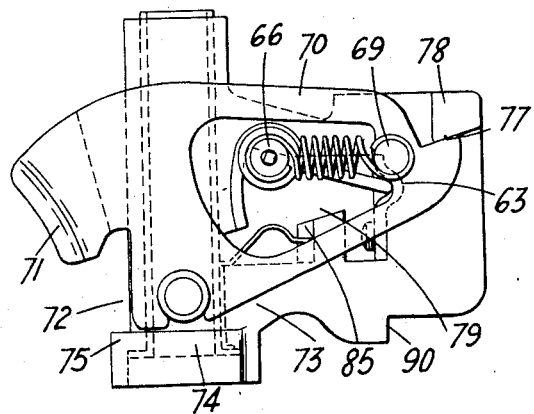
Fig. 6 shows in side elevation the unit formed by the operating trigger, switch and brush holder detached and in the "off" position and to the same scale as Fig. 5.

The tool illustrated in the drawings, which is one example of a tool constructed according to the invention, is a relatively small portable electric hand drill of the gun or pistol type. It comprises three main casing portions. The front portion 9 is journalled to receive the chuck shaft 10 carrying the chuck 11. It also is shaped at the rear to accommodate the gear wheel 12 and the pinion end 13 of the armature shaft 14 which meshes therewith. It is closed by a cover plate 15 which carries one of the bearings 16 for the armature shaft.

17 is a spring-returned locking pin or plunger the rear end 18 of which is adapted to be inserted into any one of the apertures 19 in the gear wheel 12, when the front of the plunger is pushed inwardly. This immobilizes the chuck spindle and allows the chuck to be manipulated by its knurled surface 20 for tool changing purposes.

The shape of the intermediate portion of the casing will be gathered from the drawings. It comprises a part 21 of a pistol grip which merges into the main body which latter includes a lower bulged part 22 which at its front is shaped somewhat as a part of a cylinder to engage the lower part of the casing 9. The upper part of the main body 23 is somewhat narrowed, being larger towards the front where it also engages the casing portion 9 and it should be observed that the main body portion from its front narrows or tapers rearwardly.

The other body portion is the end member 24, the lower part of which completes the pistol grip, the three body portions giving flush surfaces where they join. The portion 24 is secured to the portion 21 by a screw 25 the head of which engages in a recess 26 at the rear of the portion 24, the screw engaging in a tapped boss 27 in a cross piece 35 connecting the side walls of the portion 21 in an intermediate position as shown in Fig. 4.

The portions 9 and 21 are connected by screws 28 and 29 which also serve to hold the cover plate 15 in position. Between the cover plate and the contacting edge of the casing portions 22 and 23 gaps 30 and 31 are left to the interior for the ventilation of the interior by the fan 32 mounted on the armature shaft 14, another passage for air being located at 33 in the lower part of the pistol grip and leading to the hollow interior.

The other bearing 34 for the armature shaft is carried by the cross piece 35 which comes adjacent the commutator 36 which is engaged by an upper brush 37, accessible by the removal of the plug 38 screwed into the top portion of the casing 21, and carried by a conducting liner 39.

This latter in turn is mounted in a sleeve 40 of insulating material held in position in the socket of the plug 38 by a collar and apertured on one side at 41 for a contact-making pin or plunger carried in a member 42 of insulating material, and the other end of which comes into spring-pressed contact with a spring tongue 43 of conducting material forming one of the contacts for the winding 44 of the field magnet 45, which is of horseshoe type.

Figure 7:
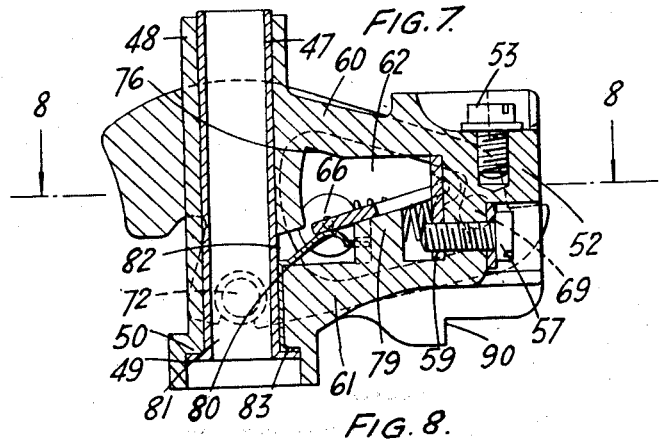
Fig. 7 is a similar view to Fig. 6 but in section and with the parts in the "on" position.
Figure 8:
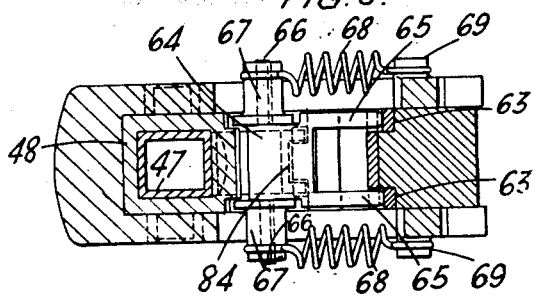
Fig. 8 is a sectional plan taken on the line 8—8, Fig. 7.

The other brush 46 is also carried in a metallic liner 47 mounted in a body of insulating material, as more specifically shown in Figs. 6, 7 and 8. The shape of this body is best seen from the section of Fig. 7 and it comprises to the left-hand side the socket portion 48 for the reception of the liner 47. The lower end of the socket 48 is formed as a cylindrical recess 49 to receive the turned-over end 50 of the liner 47 and also to accommodate the inner end of a brush-retaining plug 51 shown in position in Fig. 4 where it will be seen it is mounted by means of a screwed exterior in a similarly threaded aperture in the base of the handle. This inner end of the plug 51 also acts as part of a means for retaining the shaped body of insulating material in position. The other side 52 of the said body is recessed on its upper portion to receive the head of a terminal screw 53, the screw engaging in a tapped bore in the body. This screw forms a terminal for the leads 54 and 55 (Fig. 4), the former coming from the exterior through the connector 56 and the latter passing to the other end of the windings 44 of the field magnet 45. The side of this portion 52 has a further recess to accommodate the head 57 of a screw which has a dual purpose. This forms the terminal for a lead 58 from the connector 56 and also acts as a fixing screw for a contact base plate 59, the screw passing through an aperture in the portion 52 of the body to engage with a threaded aperture in the metallic base plate 59. The portions 48 and 52 of the insulating body are connected together by upper and lower members 60 and 61 and these parts enclose a recess or space 62, one wall of which is occupied by the plate 59. This plate is shaped with two depressed portions 63 coming at its sides and forming the fulcrum points for a rocking plate or toggle 64 having limbs 65 to engage in the recessed portions 63. This plate 64 is of conducting material and has projecting arms 66 projected by flanged and grooved sleeves 67 of insulating material with which engage the one ends of tension springs 68. The other ends of these springs engage projecting pins or pivots 69 formed integrally with the arms 70 of a trigger 71 which "straddles" the insulating member as shown in Figs. 6, 7 and 8. The arms 70 are pivoted to the insulating member on the two sides, that is to say to the lower portion of the part 48 of this insulating member at 72.

The pivots 72 are formed as integral projections of insulating material with the part 48 and in order to engage the arms 70 with these pivot portions they are formed with circular recesses 73 having openings 74. The openings 74 are of such size that they can just pass the pivots 72 but the circular recess 73 is of greater diameter than the pins 72. In order to maintain the parts in position a sleeve 75 is fitted into the space left between the pivot 72 and the circular recess 73. This forms a bush to the pivoting action and retains the trigger in position.

The upper portion of the opening 62 at 76 forms one limiting stop for the toggle 64 and this toggle comes in contact therewith in the "off" position and as shown in Fig. 6. In this position also stops 77 at the ends of the arms 70 contact with abutments 78 integral with the portion 52 of the insulating body. The other limiting stop for the toggle is comprised by a projection 79 as shown and the toggle comes into contact therewith in the "on" position as shown in Fig. 7.

The liner 47 serves as a retainer for a contact 80. This is formed from strip metal of a springy nature and has a portion 81 which lies in contact with the liner and the upper part of which passes through an aperture 82 from the opening 62 into the shaped bore through the portion 48. The end of the strip 81 is bent round at 83 and comes between the flange 50 of the liner 47 and its seating. The other end of the contact 80 is forked at 84, the two limbs of the fork coming beneath projections 85 integral with the stop 79. These projections 85 limit the upward movement of the contact 80 but it can move downwardly to a slight extent. As shown, the contact portion proper is comprised by a curved hump and in its uppermost position, as shown in Fig. 6, it is in position to be engaged by the toggle 64 when this latter is moved to its "on" position. Just before the toggle reaches this position, however, it makes contact with the contact 80, slightly depresses this, causing the limbs of the fork to move away from the projections 85 (as shown in Fig. 7). At the same time there is a slight rubbing action between the metallic toggle 64 and the metallic contact 80. This keeps the contact bright and polished and the electrical circuit proceeding from the terminal 57 passes to the plate 59, then to the toggle, from the toggle through the contact 80, from this contact to the liner 47, and from the liner to the brush.

It should be specifically pointed out that the arms or connections 66 of the toggle 64 form a centre or axis which in the two positions of the toggle remain on the same side of an imaginary line joining the centres of the pivots 72 and 69. Thus the springs 68 always tend to bring the trigger 71 into the "off" position. At the same time it should be pointed out that in the "off" position the line joining the centres 66 and 69 comes on one side of the dead centre (recesses 63) whilst in the "on" position this line comes on the other side of the dead centre.

Consequently it readily will be seen that the spring means provided has a dual function, that is to say it acts as a return spring for the trigger and it acts as the spring for the toggle mechanism.

This spring means further has the properties that when in the "on" position the pressure of the finger to retain the contacts is but slight as the centre 69 is approaching the line between the pivots 72 and 69 in this position. Further, although an efficient contact is made between the toggle 66 and the contact 80 there is no grip or "sticktion" between the parts to be overcome, either in making the contact or breaking the contact.

The body of insulating material straddled by the trigger, as a unitary structure together with the brush, is inserted into position before the portion 24 is secured in position. For this purpose the interior of the lower portion 21 is shaped as shown in Fig. 5 and has an aperture 86 for the passage of the trigger 71 to the exterior. It also has side walls 87 which come over the ends of the pivots 72 and incidentally prevent the bushes 75 from working out. It is secured in position by a plate 88 (Fig. 4) held by screws 89 taking into threaded bores in the lower extensions of the side walls 87. This plate engages with the projections 90 on the underside of the body of insulating material beneath the screw 57.

The field magnet is of the horseshoe type with the windings at the upper part of the casing and with the opening between the limbs at the lower part of the casing. This permits the bulk of the casing to be smaller than if another type of field magnet were employed and by the arrangement facilitates the formation of the hand grip, the structure still further having the bulk reduced by locating one of the brushes (46) and its holder within the handle.

If the necessary machining on the interior of the casing follows closely the contour of the limbs of the field magnet, when machining the interior of the casing it is necessary that this casing should be set up on two separate occasions as turning etc. has to take place about two axes, i. e., that of the armature shaft (which corresponds to the interior curvature of the limbs of the magnet) and that of the curvature of the exterior of the limbs of the magnet. To obviate this double setting up, the inside of the casing is only machined where required about the axis of the armature shaft and the limbs of the magnet are formed or provided with shaped or projecting portions to register with the interior machining.

Figure 9:
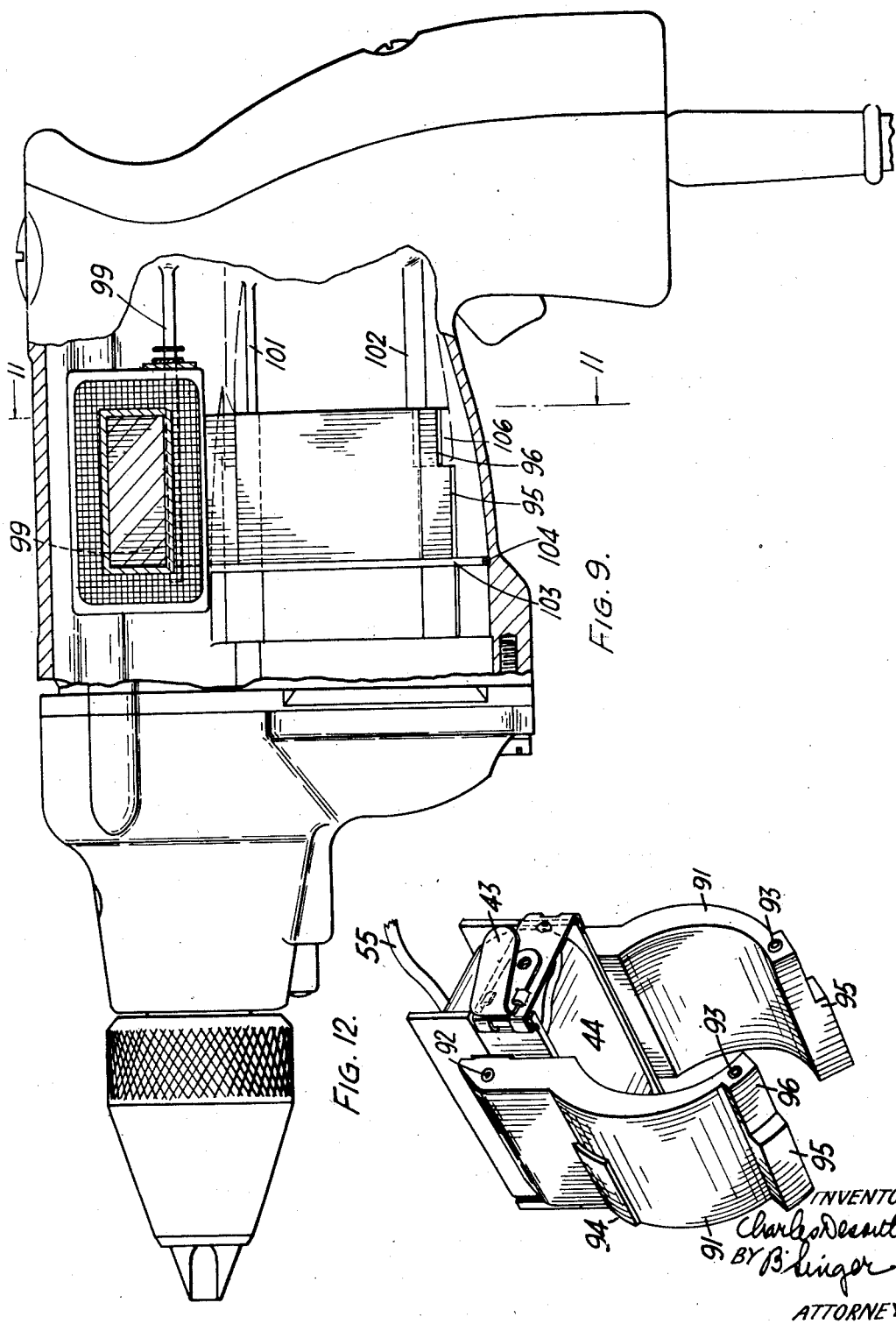
Fig. 9 is a somewhat similar view to Fig. 4 but partly in outside elevation and with the armature and other parts removed to show the field magnet mounting.
Figure 10:
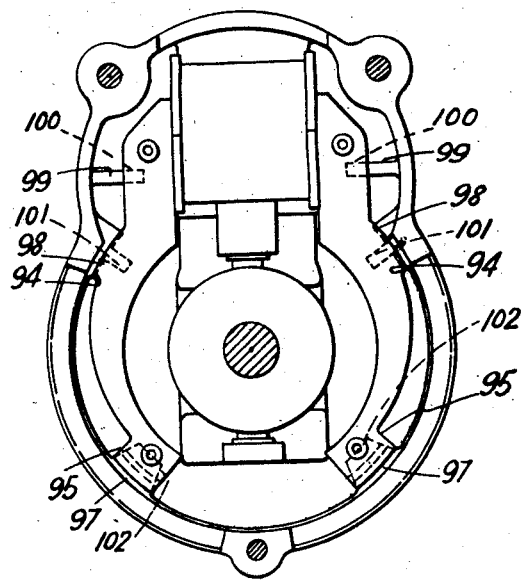
Fig. 10 is an end elevation of the casing, with parts removed, taken from the chuck end but with the gear casing and chuck removed to show the field magnet mounting.
Figure 11:
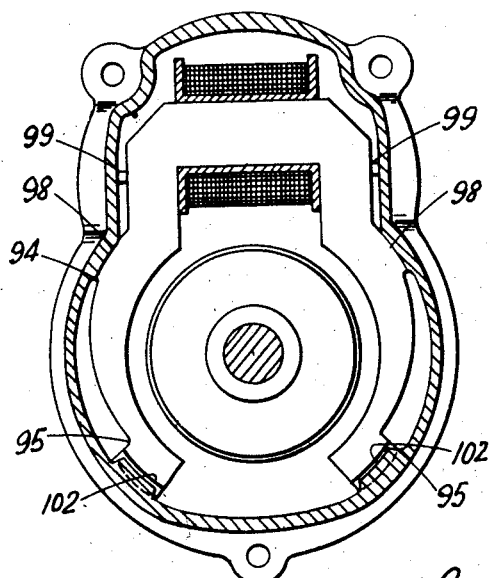
Fig. 11 is a section on the line 11—11, Fig. 9.

This will be seen clearly in Fig. 12 where each limb 91 of the field magnet is made up from the required number of laminations riveted together at 92 and 93 and has three projecting portions 94, 95 and 96 (the portion 94 not showing on one limb). It should be pointed out that the projections 95 come towards the chuck end of the tool and these, as shown in Fig. 10, register on their exterior face with the machined portions 97 on the interior of the casing. Similarly, the projecting portions 94 come towards the chuck end and register with machined portions 98 in the casing. Towards the handle end of the tool, however, the projections 96 have somewhat less radial extent and consequently it is possible to reduce the diameter of this portion of the casing adjacent thereto as seen clearly in Figs. 1, 4 and 9. This reduction in the diameter of the casing in this position gives greater accommodation for the fingers of the hand and to a large extent retains the maximum advantage of using a horseshoe form of magnet, without the disadvantage of the double setting up for the machining of the interior of the casing.

The interior of the casing is formed with ribs 99 which are stepped at 100 to form stops axially to position the field magnet. Longitudinally also the ribs 99 contact with the upper portions of the laminations to register the field magnet in position.

Similarly, other ribs 101 are provided extending towards the handle to act as limiting stops for the insertion of the field magnet. Finally, other ribs 102 are provided, extending towards the handle, with which the lower ends of the rear lamination contact.

Between the machined portion 97 and the rib 102 what may be regarded as an extension of the rib 102 projects towards the chuck end in the form of a step 106 to co-operate with or just clear the projection 96.

When the field magnet is inserted in position it is axially retained by the spring 103 which can enter a groove 104 in the interior of the casing.

Fig. 12 also illustrates the spring contact 43 which leads to one end of the windings 44, 55 being the lead to the other end of the windings.

The invention is not limited to the precise forms or details of construction described, as these may be varied to suit particular requirements.

Certain features herein illustrated and described but not claimed constitute the subject matter of my copending application Serial No. 139,623.

What I claim and desire to secure by Letters Patent of the United States of America is:—

1. In an electrically driven tool of the character described, an outer casing, an electric motor located in said casing comprising an armature with shaft and a horseshoe magnet with windings, projections on the exterior of the two limbs of said magnet, the said projections having locating surfaces generated from the armature axis, and co-operating locating surfaces on the interior of the outer casing also generated from the armature axis.

2. In an electrically driven tool of the character described, an outer casing, an electric motor located in said casing comprising an armature with shaft and a horseshoe magnet with windings, projections on the exterior of the two limbs of said magnet towards each axial end thereof, the said projections having locating surfaces generated from the armature axis, co-operating locating surfaces on the interior of the outer casing also generated from the armature axis, the generating radial dimensions from the armature axis of the locating surfaces of the magnet projections at one axial end of the magnet being less than those at the other axial end of the magnet, and the co-operating locating surfaces on the interior of the outer casing having corresponding radial variations.

3. In an electrically driven tool of the character described, an outer casing, a pistol grip at one end of said casing, an electric motor located in said casing comprising an armature with shaft and a horseshoe magnet with windings, projections on the exterior of the two limbs of said magnet towards each axial end thereof, the said projections having locating surfaces generated from the armature axis, co-operating locating surfaces on the interior of the outer casing also generated from the armature axis, the generating radial dimensions from the armature axis of the locating surfaces of the magnet projections at one axial end of the magnet being less than those at the other axial end of the magnet, the co-operating locating surfaces on the interior of the outer casing having corresponding radial variations, and the said pistol grip being located at the end with the smaller radial dimensions.

4. In an electrically driven tool of the character described, an outer casing, a pistol grip at one end of said casing, an electric motor located in said casing comprising an armature with shaft and a horseshoe magnet with windings, the windings coming in a position with respect to the centre of rotation diametrically remote from the pistol grip and the limbs of the magnet convergingly tapering from the windings towards their free ends, projections on the exterior of the two limbs of said magnet towards each axial end thereof, the said projections having locating surfaces generated from the armature axis, co-operating locating surfaces on the interior of the outer casing also generated from the armature axis, the generating radial dimensions from the armature axis of the locating surfaces of the magnet projections at one axial end of the magnet being less than those at the other axial end of the magnet, the co-operating locating surfaces on the interior of the outer casing having corresponding radial variations, and the pistol grip being located at the end with the smaller radial dimensions.

5. An electrically driven tool of the character described and as set forth in claim 4, including an outer casing provided with a shaped open and remote from the pistol grip to permit the insertion of the horseshoe field magnet with windings, stops in the casing to limit the longitudinal insertion movement of the said magnet, means to retain the magnet in such position with its co-operating locating surfaces in contact with those on the interior of the outer casing, and a front casing member closing in the open end of the outer casing.

6. An electrically driven tool of the character described and as set forth in claim 4, including an outer casing provided with a shaped open end remote from the pistol grip to permit the insertion of the horseshoe field magnet with windings, inwardly projecting angularly spaced longitudinal ribs on the interior of the outer casing, the said ribs being provided in parts of their lengths with the locating surfaces of the casing, steps in the said longitudinal ribs to form stops to limit the longitudinal insertion movement of the said magnet, means to retain the magnet in such position with its co-operating locating surfaces in contact with those on the interior of the outer casing, and a front casing member closing in the open end of the outer casing.

7. An electrically driven tool of the character described and as set forth in claim 4, including a horseshoe magnet structure comprising assembled laminations, the said laminations having formed integrally therewith projections to constitute the exterior projections of the magnet, and having the locating surfaces generated from the armature axis.

8. An electrically driven tool of the character described and as set forth in claim 4, in which the projections with locating surfaces generated from the armature axis and coming on the exterior of the limbs of the magnet are located at the free ends thereof.

CHARLES DESOUTTER.